Oct. 13, 1925.　　　　　　　　　　　　　　　1,557,115
J. F. STEVENSON
JACKING UP OF MOTOR VEHICLES
Filed Sept. 26, 1923　　　3 Sheets-Sheet 2

Inventor:
John Ferguson Stevenson
By Niederslum & Fairbanks.
Attorneys.

Oct. 13, 1925.
J. F. STEVENSON
1,557,115
JACKING UP OF MOTOR VEHICLES
Filed Sept. 26, 1923  3 Sheets-Sheet 3
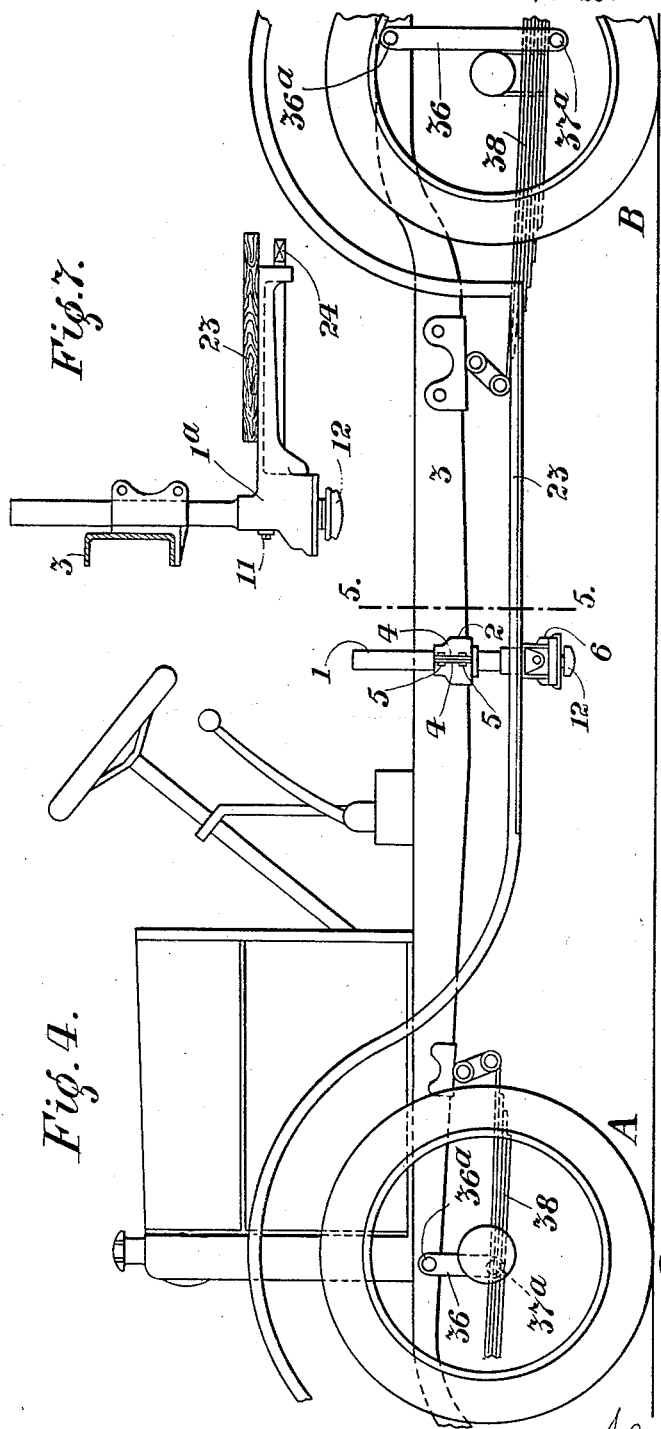
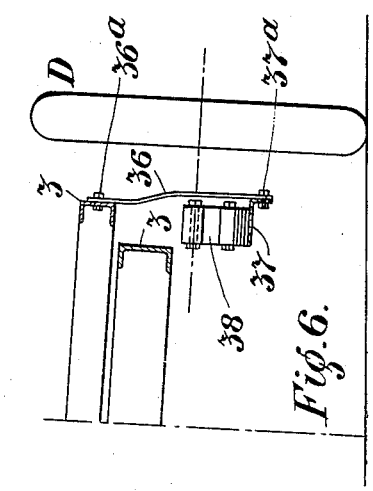
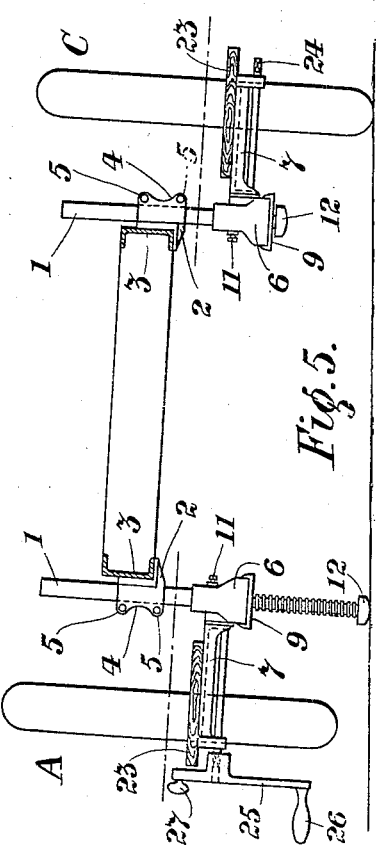

Patented Oct. 13, 1925.

1,557,115

UNITED STATES PATENT OFFICE.

JOHN FERGUSON STEVENSON, OF BELFAST, IRELAND.

JACKING UP OF MOTOR VEHICLES.

Application filed September 26, 1923. Serial No. 664,830.

*To all whom it may concern:*

Be it known that I, JOHN FERGUSON STEVENSON, of 44 Chichester Street, Belfast, Ireland, a subject of the King of Great Britain and Ireland, have invented certain new and useful Improvements Relating to the Jacking Up of Motor Vehicles, of which the following is a specification.

This invention has reference to the jacking up of motor vehicles.

According to the present invention, I jack up both the road wheels at either side of a motor vehicle by means of a single jack permanently secured directly, or indirectly, to the chassis side member of the vehicle or any other suitable portion of the vehicle on the same side as the wheels to be lifted and preferably arranged at a point between the front and rear axles to balance or approximately balance the lifted weight.

The jacking apparatus may be either hand, pneumatically, hydraulically, or mechanically actuated and may, if hand operated, be adapted to be operated by means of the engine crank handle or a special handle. If pneumatically or hydraulically operated, the apparatus may be worked from a pump which may, or may not, be driven by the engine. The jacking apparatus may be adapted to form the, or part of the, bracket for supporting the running board of the vehicle. Preferably I employ a hand operated screw jack operated through or by a shaft permanently attached to the vehicle, for example to the running board or a bracket or bearings thereunder, the outer end of the shaft providing a fixed fulcrum for the attachment of a crank or equivalent hand operating device, whereby great purchase or power is obtainable.

In conjunction with the apparatus means may be provided for limiting the upward movement of the sprung portion of the vehicle relatively to the unsprung portion, but without interfering with the normal functioning of the vehicle springs.

Jacking up either side of a motor vehicle in accordance with this invention by means of a single jack, enables the vehicle to be jacked up without distortion of the vehicle frame, and also prevents the vehicle being put into motion until the jack is moved from operative position. The jacks are always ready and in position for use.

Two sheets of explanatory drawings, illustrating, by way of example, one method of carrying out my invention and two constructional forms of jacking apparatus, drawn to a larger scale, are hereunto appended.

On the drawings:—

Fig. 4 shows a jacking apparatus secured to one of the chassis side members of a motor vehicle.

Fig. 5 is a cross section on the line 5—5 Fig. 4 and shows one of the jacks in the operative position.

Fig. 6 is a part sectional view showing a device for limiting the relative movement of the sprung and un-sprung portions of the vehicle.

Fig. 7 shows the jacking device embodied in and forming part of a bracket.

Figure 1:
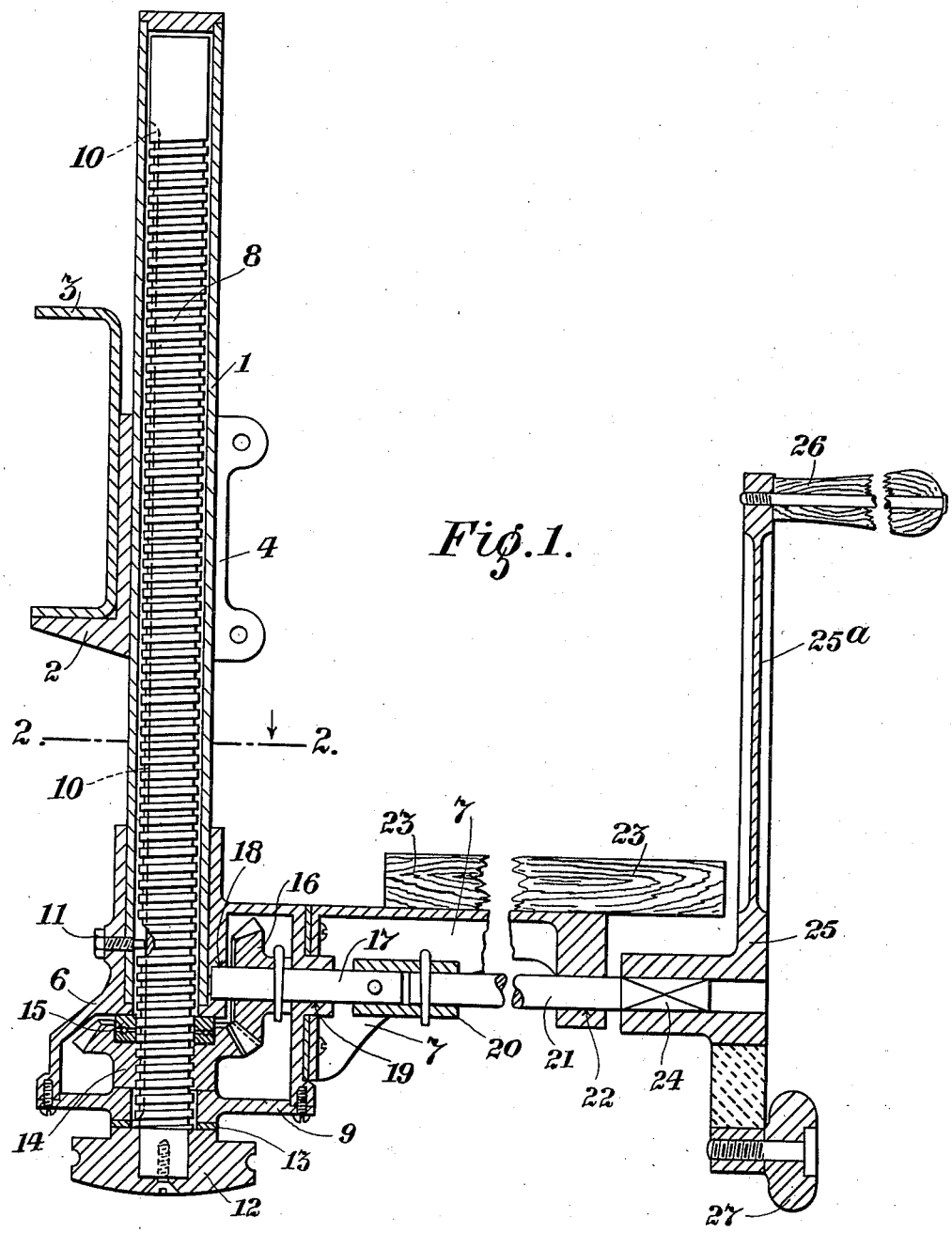
Fig. 1 is a sectional side elevation of a hand operated jacking apparatus secured to a chassis side member of a motor vehicle.
Figure 2:
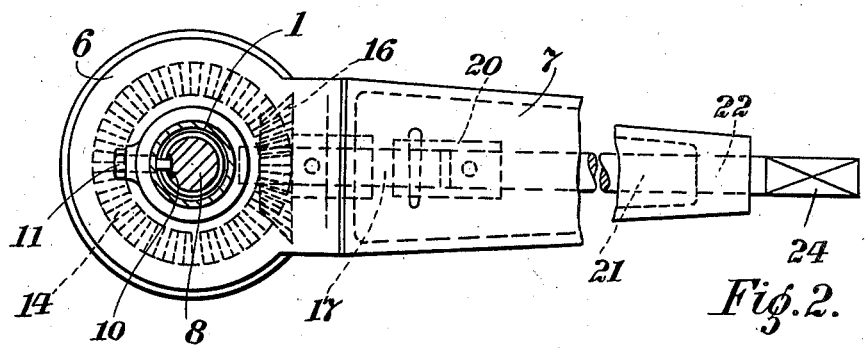
Fig. 2 is a partly sectioned plan view on the line 2—2 of Fig. 1.

Referring firstly to Figs. 1 and 2:—

The jack shown comprises an outer tube 1 which is adjustably secured in a split bracket 2 permanently fixed to a chassis side member 3 of the motor vehicle. The said bracket comprises two lugs 4, 4, which can be drawn towards each other by means of fastening devices 5, 5, Fig. 4, so as to grip the exterior of the tube and retain it in any desired position. The bottom end of the outer tube projects into, and is secured to, a box-like gear case 6 to which a bracket 7, arranged beneath the running-board 23, is also secured. A screwed shaft 8 is movably arranged within the outer tube 1 and projects, at its bottom end, through an aperture in a cover 9 closing the open end of the gear case. The shaft 8 is provided with a longitudinally extending channel or slot 10, wherein the inner end of a set screw 11 projects, the arrangement being such that the said shaft cannot turn but is free to move axially up and down in the outer tube. A shoe 12 is secured to the bottom end of the shaft 8, a washer 13 being provided between the underside of the cover 9 and the said shoe.

A bevel wheel 14 is loosely screwed on the shaft 8 and is provided with a thrust bearing 15. The bevel wheel is engaged by a bevel pinion 16 secured to a shaft 17 rotatably arranged in bearings 18 and 19, formed in the gear case 6, and connected by means of a coupling 20 to a shaft 21 rotatably arranged in a bearing 22 formed in the bracket 7. The outer end of the shaft 21 is formed with a squared part 24 which is engaged by an operating crank 25 having two handles 26 and 27 at different distances from the centre of the shaft 21.

In its working position a jack is secured to each chassis side member in the manner shown in Figs. 4 and 5, and, in order to bring the shoe 12 into contact with the ground, the coupled shafts 21 and 17 are rotated rapidly by turning the crank 25, using the handle 27 at the smaller radius from the centre of the shaft 21. The rotation of the said shafts causes the bevel wheel 14 to rotate, the said wheel by reason of its threaded part engaging the threaded part of the shaft 8, causing the latter to move downwards. The shaft 8 is prevented from rotating by the set screw 11 engaging in the slot 10. When the shoe 12 has come into contact with the ground, in order to jack up the vehicle, the rotation of the shafts 21 and 17 is continued, but, in this case, by using the handle 26, which latter enables the operator to obtain a greater leverage owing to the length of the arm 25ª. The wheels A, B, of the vehicle on the same side as the jack are both raised clear of the ground as shown in Fig. 5, the vehicle resting only on the jack employed and the wheels C, D, at the other side.

Figure 3:
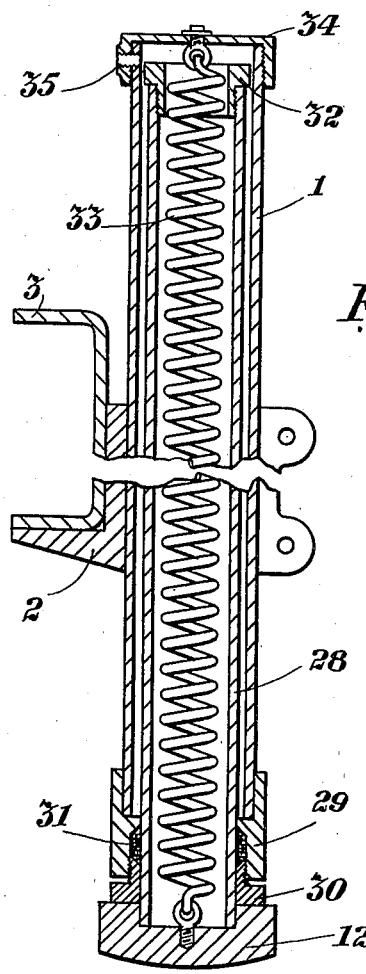
Fig. 3 is a sectional view of an hydraulically operated apparatus.

A form of fluid pressure jack is illustrated in Fig. 3. The jack comprises an outer tube 1, adjustably secured in a bracket 2 attached to a chassis side member 3. A ram 28 is slidably arranged within an end cover 29, screwed on to the outer tube 1, and a gland 30 which screws into the cover 29 and retains packing 31 therein. A shoe 12 is secured to the outer end of the ram, a ring 32 being screwed into the inner end. A tension spring 33 is fixed, at one end, to a cover 34 closing the upper end of the outer tube and, at its other end, to the shoe 12.

In operation, liquid, oil for example, under pressure is admitted, from any suitable supply source, to the outer tube 1 through a passage 35 formed in the wall of the outer tube and in the cover 34, the ram 28 and shoe 12 being forced downwards. The spring 33 is thus extended and acts to draw up the ram into its normal position when the operating liquid is exhausted from the outer tube. The jack can, of course, be operated pneumatically in known manner if so desired.

The jack may also, as shown in Fig. 7, be embodied in and form part of a bracket for supporting the running board 23 and in this case the outer tube 1 and the gear case 6 would form a single casting 1ª adjustably secured in the bracket 7 in the manner illustrated.

It will be readily understood that when jacking-up pressure is applied to the sprung portion of a vehicle, a considerable amount of upward movement of the said portion must necessarily take place before the wheels are clear of the ground. In order to limit the upward movement of the sprung portion, without interfering with the usual functioning of the springs, straps 36 are secured for each spring at the front and rear ends of the vehicle, see Fig. 4, each strap with one end attached by a bolt 36ª to the chassis side member 3 and each provided, at the other end, with a check 37, Fig. 6, which is in contact with the vehicle spring 38 and secured by bolt 37ª. It should also be noted that, by the use of the said checking devices, although the side of the vehicle is lifted, one wheel at a time may be raised from the ground, by leaving one of the said checking devices in its operative position and removing the other.

Jacking apparatus secured to a chassis side member as shown, occupies a particularly unhampered and readily accessible position, and there is the further advantage that the jack and the entire means for operating the same are attached to portions of the vehicle which are always in the same relative position, avoiding chains, etc., for operating in the case of screw or other mechanical jacks and avoiding the use of flexible tubing in the case of fluid jacks operated by power or by hand.

If desired, means may be provided for operating the jacks mechanically from the engine.

What I claim and desire to secure by Letters Patent is:—

1. A four-wheeled motor vehicle having two jacks attached to the frame thereof and disposed one at each side of the vehicle, each jack being adapted to act on one side only of the vehicle and to lift it bodily at that side so that the vehicle when lifted will rest on the two wheels on the opposite side, the two wheels at the same side as the operative jack being raised off the ground.

2. A four-wheeled motor vehicle having two jacks attached to the frame thereof and substantially centrally disposed one at each side of the vehicle, each jack being adapted to act on one side only of the vehicle and to lift it bodily at that side so that the vehicle when lifted will rest on the two wheels on the opposite side, the two wheels at the same side as the operative jack being raised off the ground.

3. A motor vehicle, having permanently attached to the sprung part thereof two jacks, a single jack being located at each side of the vehicle and being adapted to lift up both road wheels at its side of the vehicle and each jack being embodied in a side bracket for supporting a running board of the vehicle.

4. A motor vehicle, having permanently attached to the sprung part thereof two jacks, a single jack being located at each side of the vehicle and being adapted to lift up both road wheels at its side of the vehicle and each jack forming a side bracket for supporting a running board of the vehicle.

5. A motor vehicle, having permanently attached directly to the chassis side members thereof two jacks, a single jack being located at each side of the vehicle and being adapted to lift up both road wheels at its side of the vehicle and each jack being embodied in a side bracket for supporting a running board of the vehicle.

6. A motor vehicle, having permanently attached directly to the chassis side members thereof two jacks, a single jack being located at each side of the vehicle and being adapted to lift up both road wheels at its side of the vehicle and each jack forming a side bracket for supporting a running board of the vehicle.

7. A motor vehicle, having attached to the sprung portion thereof two hand operated jacks, a single jack being located at each side of the vehicle and adapted to raise both the road wheels at its side of the vehicle and each of said jacks being adapted to be operated by a shaft permanently attached to the running board, the outer end of said shaft providing a fixed fulcrum for the attachment of a hand operated device, whereby great purchase is obtainable.

In testimony whereof I affix my signature.

JOHN FERGUSON STEVENSON.